(12) United States Patent
Hori

(10) Patent No.: US 6,441,918 B1
(45) Date of Patent: Aug. 27, 2002

(54) IMAGE OUTPUT SYSTEM IMAGE PROCESSING SYSTEM IMAGE OUTPUT METHOD IMAGE PROCESSING METHOD AND RECORDING MEDIUM

(75) Inventor: Motofumi Hori, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/201,664

(22) Filed: Dec. 1, 1998

(30) Foreign Application Priority Data

Dec. 25, 1997 (JP) .............................................. 9-357913

(51) Int. Cl.⁷ .............................................. G06K 15/02
(52) U.S. Cl. ...................................... 358/1.16; 358/523
(58) Field of Search .............................. 358/1.14, 1.15, 358/1.16, 523, 524, 404, 444, 1.1, 1.12, 1.13

(56) References Cited

U.S. PATENT DOCUMENTS 5,742,746 A   4/1998   Doi et al.

6,229,543 B1 * 5/2001 Yamada et al. ............. 345/418

FOREIGN PATENT DOCUMENTS

JP           A-4-34494         2/1992

* cited by examiner

*Primary Examiner*—Mark Wallerson
(74) *Attorney, Agent, or Firm*—Oliff & Berridge, PLC

(57) ABSTRACT

An image output system (printer) which has cache memory for storing drawing data, an interface for receiving an input command of a drawing command or a write command containing address information and drawing data from the outside, and a processor for determining whether an input command fed into the input means is the drawing command or the write command. The processor writes the drawing data into the cache memory based on the address information if the processor determines that the input command is the write command. The processor draws based on the drawing command if the processor determines that the input command is the drawing command.

15 Claims, 16 Drawing Sheets

FUNCTIONAL BLOCK DIAGRAM OF FIRST EMBODIMENT

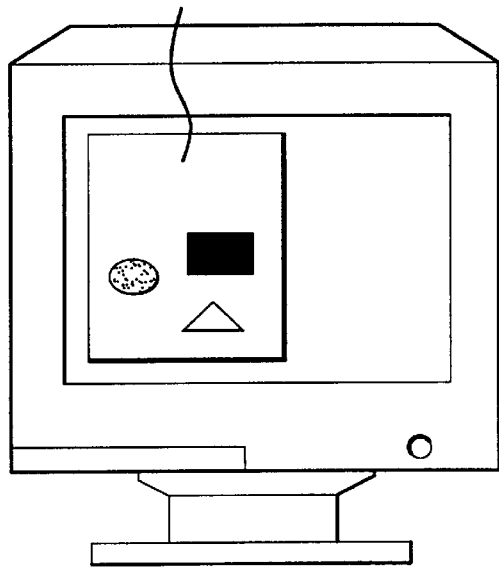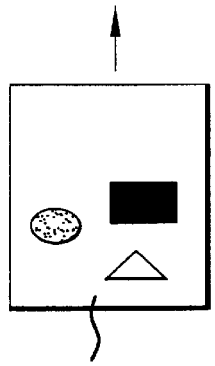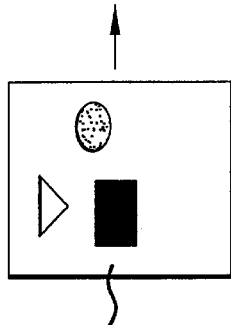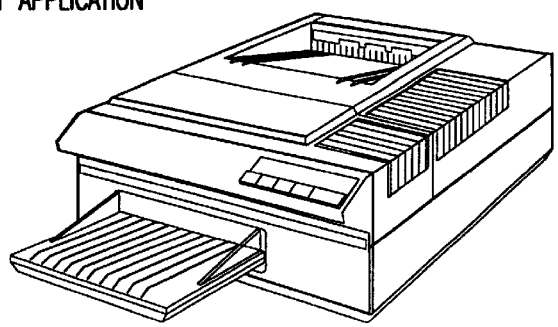
FIG. 1

CACHE PARAMETER UPON ROTATING
PAPER OF THE SECOND EMBODIMENT (1) NORMAL FONT CACHE
KEY-1 FONT ID
KEY-2 CHARACTER ID (CHARACTER CODE)
KEY-3 SCALE (EXPANSION MATRIX, ALSO CONTAINING CONVERSION CORRESPONDING TO PAPER)
DATA STORED DATA (RASTER DATA, FINAL DATA FORMAT AFTER CONVERSION CORRESPONDING TO PAPER)

(2) DOWNLOAD FONT CACHE
KEY-1 STORAGE ADDRESS
DATA STORED DATA (RASTER DATA, FORMER DATA BEFORE CONVERSION CORRESPONDING TO PAPER)

(3) WHEN DOWNLOAD FONT IS STORED IN NORMAL FONT CACHE
KEY-1 UNUSED
KEY-2 STORAGE ADDRESS (KEY-1 IN (2))
KEY-3 SCALE (EXPANSION MATRIX, ALSO CONTAINING CONVERSION CORRESPONDING TO PAPER) -KEY-3 IN (1)
DATA STORED DATA (RASTER DATA, FINAL DATA FORMAT AFTER CONVENSION CORRESPONDING TO PAPER)

FIG. 9

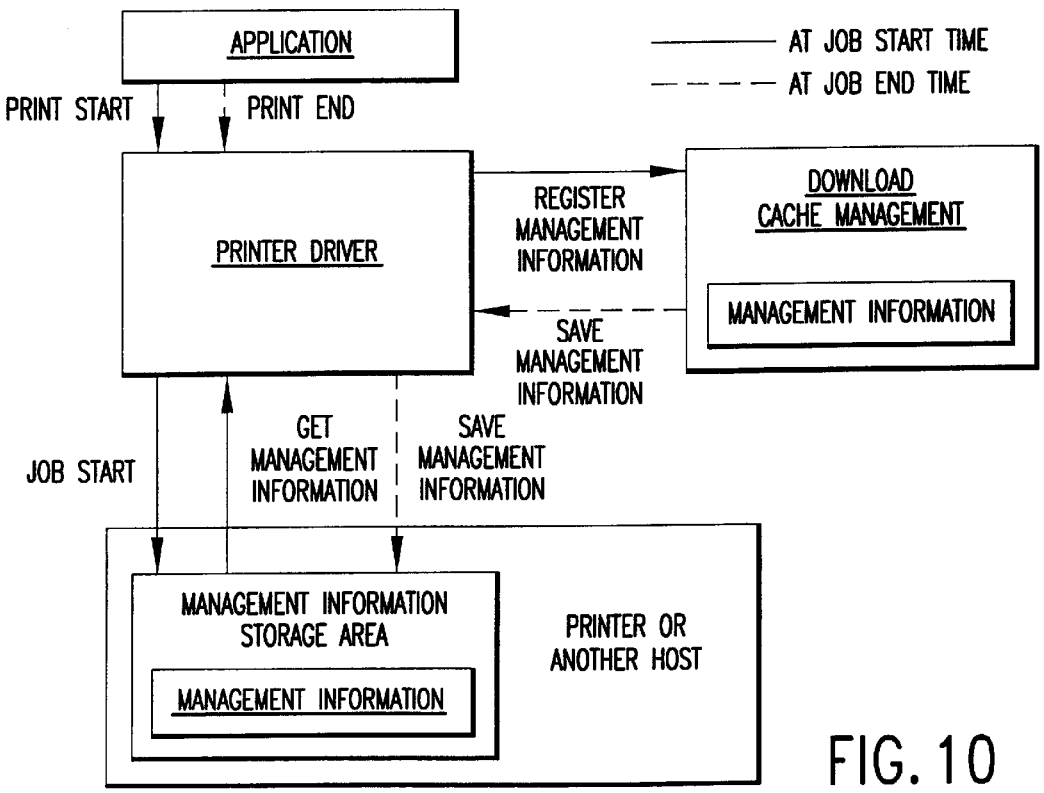

FIG. 10

PRINT SPOOLER

PRINTER

IMAGE OUTPUT SYSTEM IMAGE PROCESSING SYSTEM IMAGE OUTPUT METHOD IMAGE PROCESSING METHOD AND RECORDING MEDIUM

BACKGROUND OF THE INVENTION

This invention relates to an image output system, an image processing system, an image output method, an image processing method, and a recording medium suitably used with a printer and its host computer.

(1) Purge Processing

To prepare a high-quality document by desktop publishing, there is a demand for making fonts used with a host computer and fonts output from a printer, etc., the same. However, a desired font may not be stored in ROM, etc., of the printer. Thus, as shown in FIG. 2, a method for a printer driver of the host computer to prepare raster data and supply the raster data to the printer is possible. However, such processing involves too large traffic between the host computer and the printer, thus the processing speed lowers.

In a related art example shown in FIG. 3, if a desired font exists only in a host computer and is not installed in ROM, etc., of the printer, font data in a bit map format, etc., is downloaded into the printer from the host computer. The downloaded font data is stored in cache memory in the printer.

As a large amount of font data is thus downloaded, the font data amount will exceed the storage capacity of the cache memory. In such a case, the data area of a font occurring with a low frequency at the present time is released to download new font data. This processing is called "purge" processing. If necessary font data is stored in the cache memory, the host computer may feed a drawing command consisting of a font ID, character code, and a matrix when giving a font output instruction to the printer.

The font ID is identification code indicating the font type, such as roman, Gothic, or sans serif. The matrix is a conversion matrix used when a character is rotated or scaled. When receiving the drawing command, the printer reads the cache memory address specified by the font ID and the character code and executes conversion according to the matrix, then outputs the font to paper, etc.

On the other hand, if it is necessary to output a font not stored in the cache memory, the host computer needs to download font data before feeding the drawing command. Therefore, the host computer must keep track of the fonts stored in the cache memory. Generally, the host computer controls the printer by software called a printer driver and an algorithm of the purge processing is simulated by the printer driver.

(2) Page Description Language Processing

The drawing commands, etc., given from the host computer to the printer often follow a page description language (PDL) protocol. With PDL, graphic data of geometric figures, etc., and the font data can be supplied to the printer as required. Generally, a device-independent coordinate system is used for the graphic data; a device-dependent coordinate system is used for the font data in the bit map format, etc.

Therefore, when receiving device-independent graphic data, the printer performs matrix operations to convert the graphic data into a device-dependent coordinate system proper to the printer. To enhance general versatility of PDL, it is desirable to unify all data into a device-independent format. However, when matrix operations are performed for executing coordinate system conversion, it is inevitable that an image is a little degraded. Since the image degradation is noticeable particularly when a font is output, a device-independent coordinate system is often adopted for the font data, as described above.

(3) Rotation Processing

In the host computer, paper size and orientation (portrait or landscape) are specified for the printer; however, as shown in FIG. 1, the printer often changes the specified orientation in its own right, because if paper in the specified orientation is not provided in a tray, it is desirable to continue output if paper of the same size as specified and different in orientation exists rather than to output a "paper-out" error, it is desirable to use paper in landscape orientation preferentially because the output speed in a lateral direction is faster than that in a longitudinal direction, etc.

A printer for writing raster data fed from the host computer directly into an output buffer is also available, but as shown in FIG. 5, cannot rotate font data.

If the paper orientation is changed, an output image needs also to be rotated 90°. At the time, font data and graphic data undergo different processing. First, since the graphic data has a device-independent format as described above, matrix operations must be performed if rotation processing is not required. Then, to perform rotation processing, the matrix may be changed so as to perform coordinate system conversion and rotation at the same time.

Therefore, if graphics only is output, the processing speed little changes even if the paper orientation is changed.

On the other hand, since the font data is in a device-dependent format, matrix operations are not performed if rotation or scaling processing is not required. Therefore, if the paper orientation is changed, additional matrix operations need to be performed. In general business documents, a sheet of paper contains several thousand characters and matrix operations must be performed on each character. Thus, if the paper orientation is changed, the processing speed lowers.

For example, like PostScript (registered trademark) of Adobe, an art for adopting a device-independent format for both font data and graphics data also exists. If the art is adopted, similar coordinate conversion can be executed for both the font data and graphics data, as shown in FIG. 4. Thus, processing in changing the paper orientation is integrated into single coordinate conversion processing. However, the processing speed drastically lowers and it becomes difficult to output a high-quality image, as described above.

In the above-described art, the host computer needs to simulate the algorithm of purge processing performed in the printer. In other words, the host computer and the printer must perform the same processing, thus the resources are wasted.

Normally, the host computer and the printer use different types of CPUs, thus it is difficult to cause them to perform completely the same processing. That is, even if the purge processing contents are described in the same source code, if rounding errors, etc., of both CPUs differ, purged fonts become different. Resultantly, a font not intended by the user is output.

SUMMARY OF THE INVENTION

It is therefore an object of the invention to provide an image output system, an image processing system, an image output method, an image processing method, and a recording medium capable of using resources effectively and performing precise processing.

To the end, according to a first aspect of the invention, there is provided an image output system comprising cache memory for storing drawing data, input means for receiving an input command of a drawing command or a write command containing address information and drawing data from the outside, command type determination means for determining whether an input command fed into the input means is the drawing command or the write command, write means for writing the drawing data into the cache memory based on the address information if the command type determination means determines that the input command is the write command, and drawing means for drawing based on the drawing command if the command type determination means determines that the input command is the drawing command.

According to a second aspect of the invention, there is provided an image processing system for feeding drawing data into an image output system having cache memory, the image processing system comprising drawing data output means for outputting the drawing data, a cache management table for managing the contents of the cache memory, cache determination means for determining whether or not the drawing data is stored in the cache memory based on the contents of the cache management table, and data output means, if the cache determination means determines that the drawing data is not stored, for outputting a write command containing address information and drawing data and then outputting the drawing data.

BRIEF DESCRIPTION OF THE DRAWINGS

In the accompanying drawings:

FIG. 1 is a schematic representation of the operation of related art;

FIG. 9 is an illustration to show formats of cache parameters in the second embodiment of the invention;

FIG. 10 is a functional block diagram of a fourth embodiment of the invention;

DETAILED DESCRIPTION OF THE PREFERRED EMBODIMENTS (First Embodiment)

1.1 Outline of First Embodiment

Figure 2:
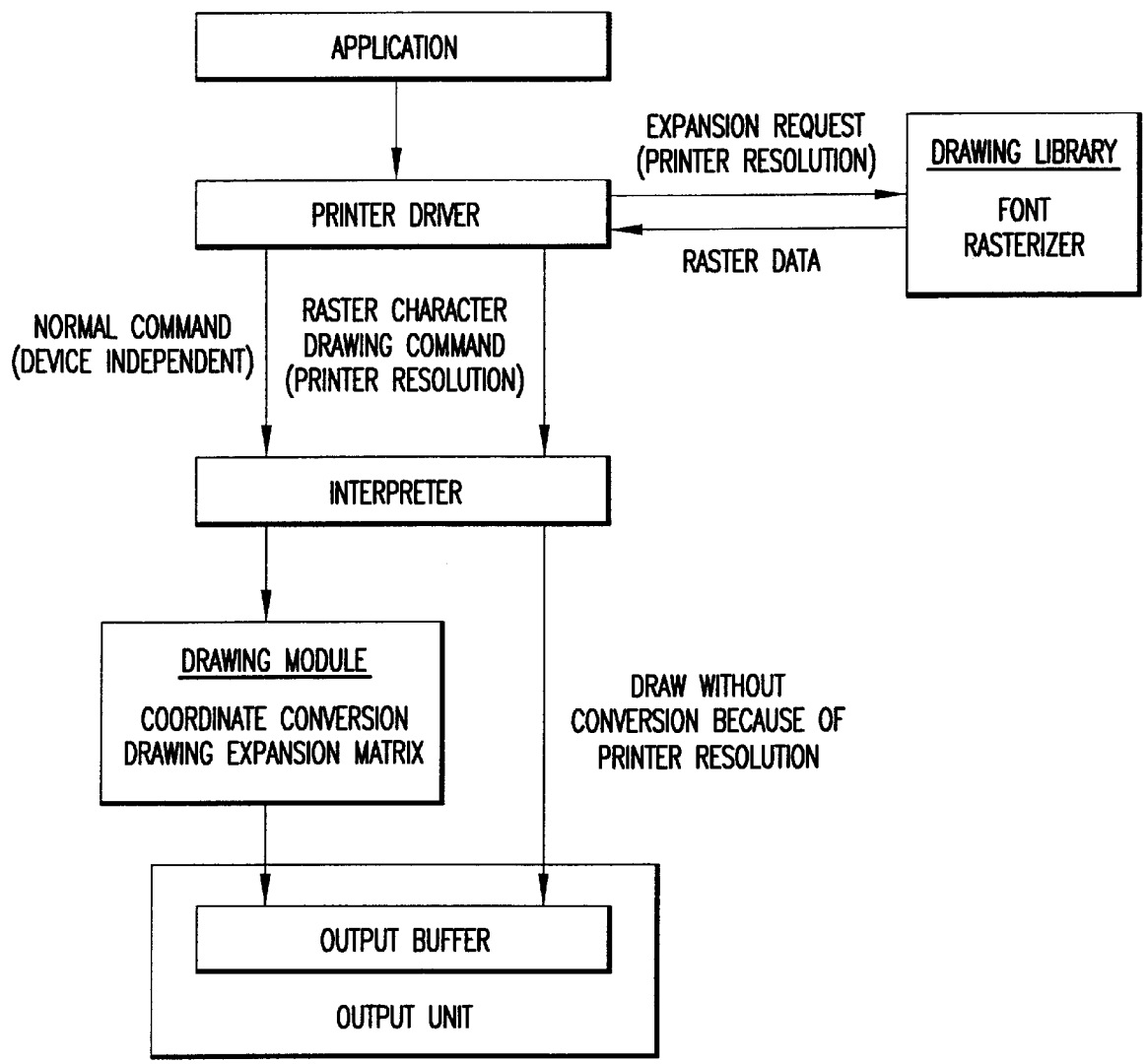
FIG. 2 is a functional block diagram of related art.
Figure 3:
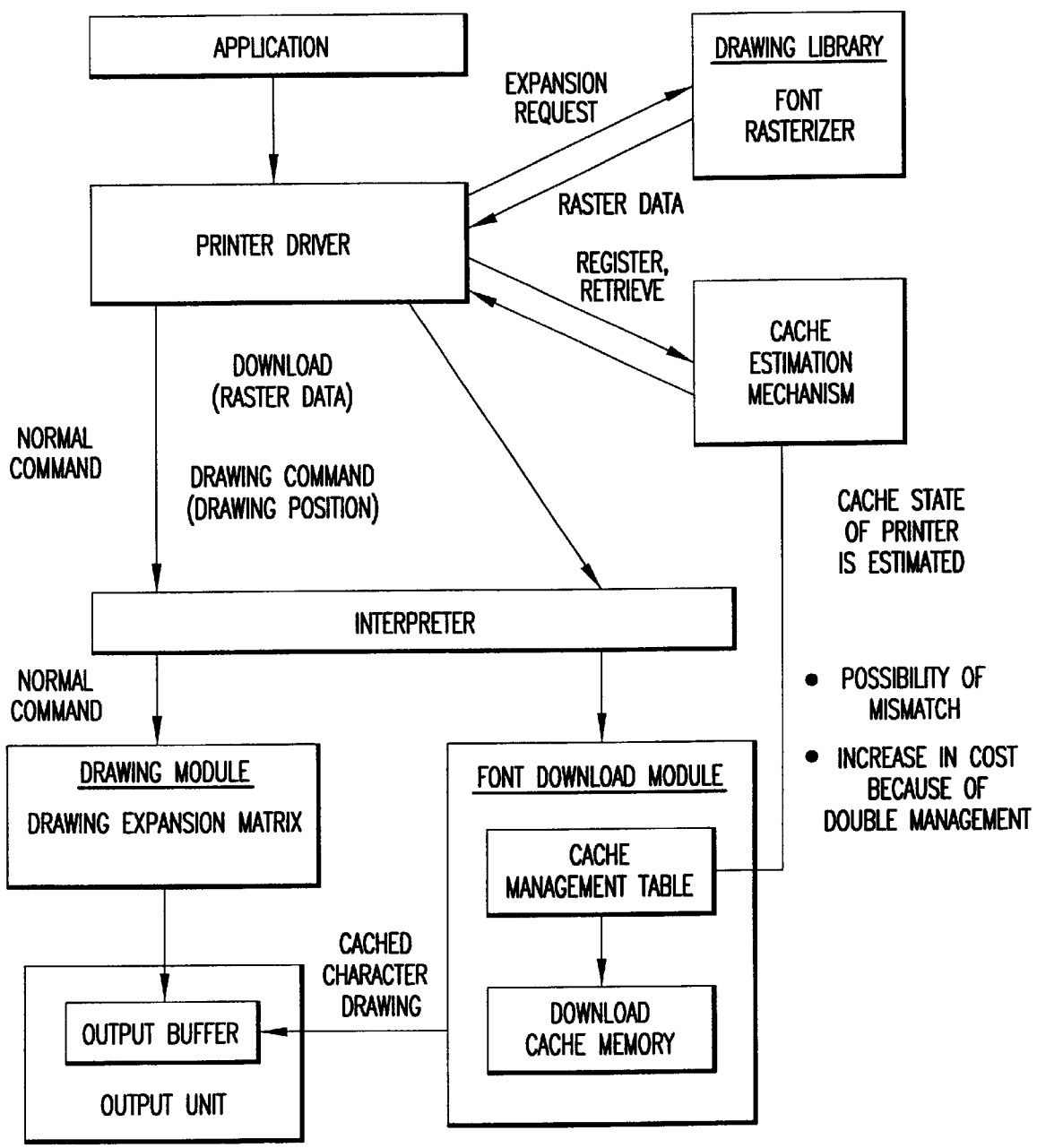
FIG. 3 is a functional block diagram of related art.
Figure 4:
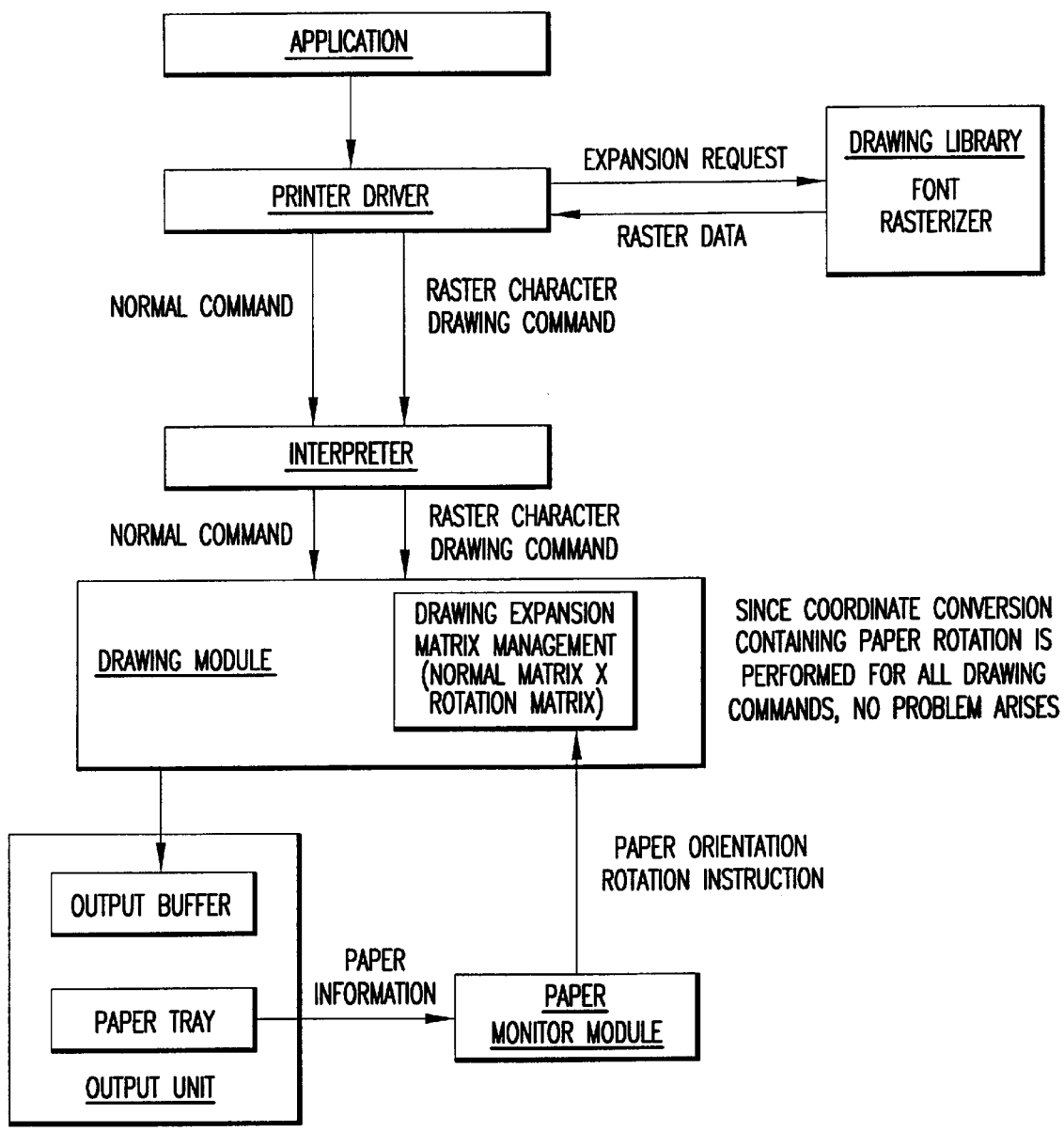
FIG. 4 is a functional block diagram of related art.
Figure 5:
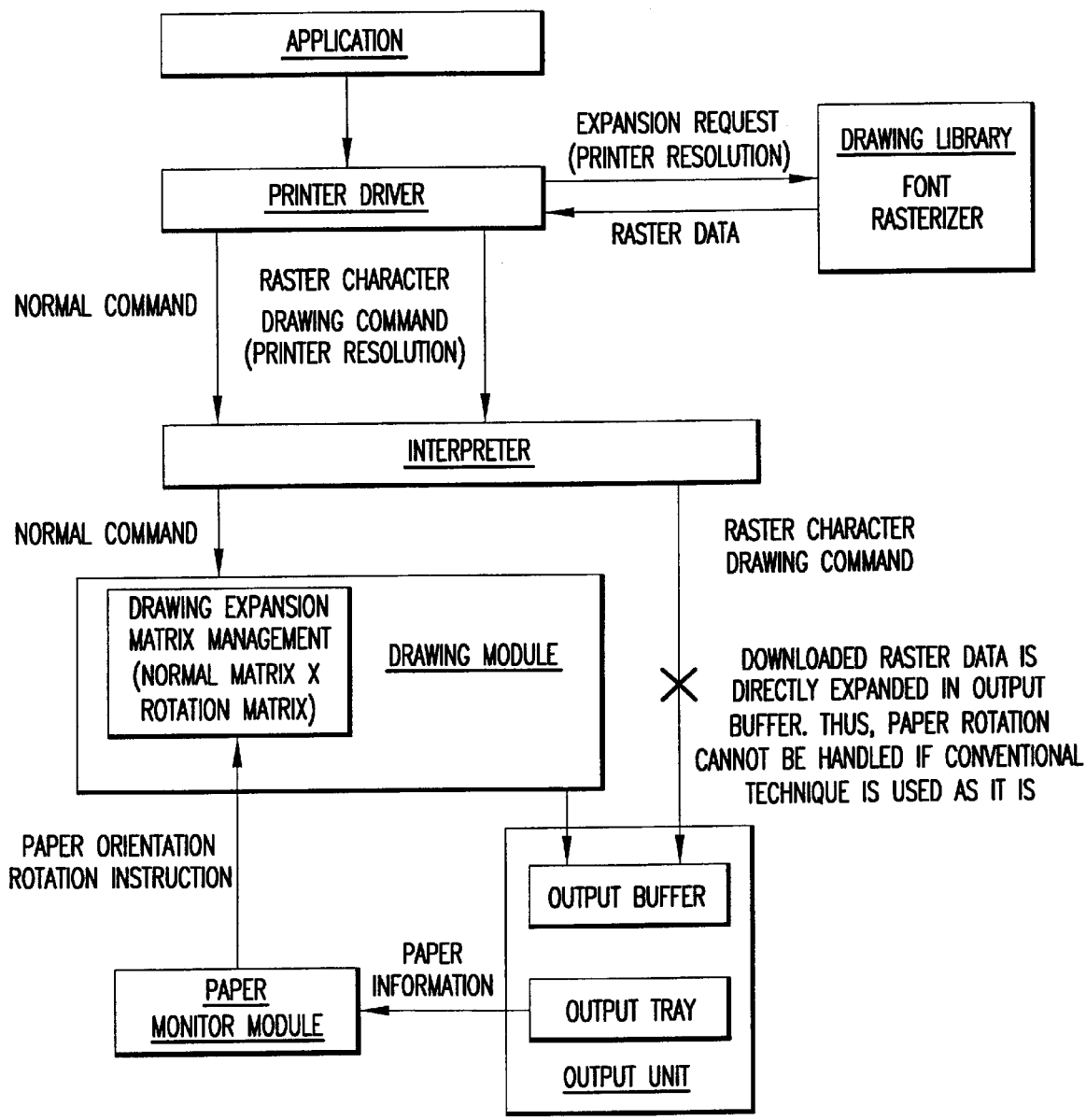
FIG. 5 is a functional block diagram of related art.
Figure 6:
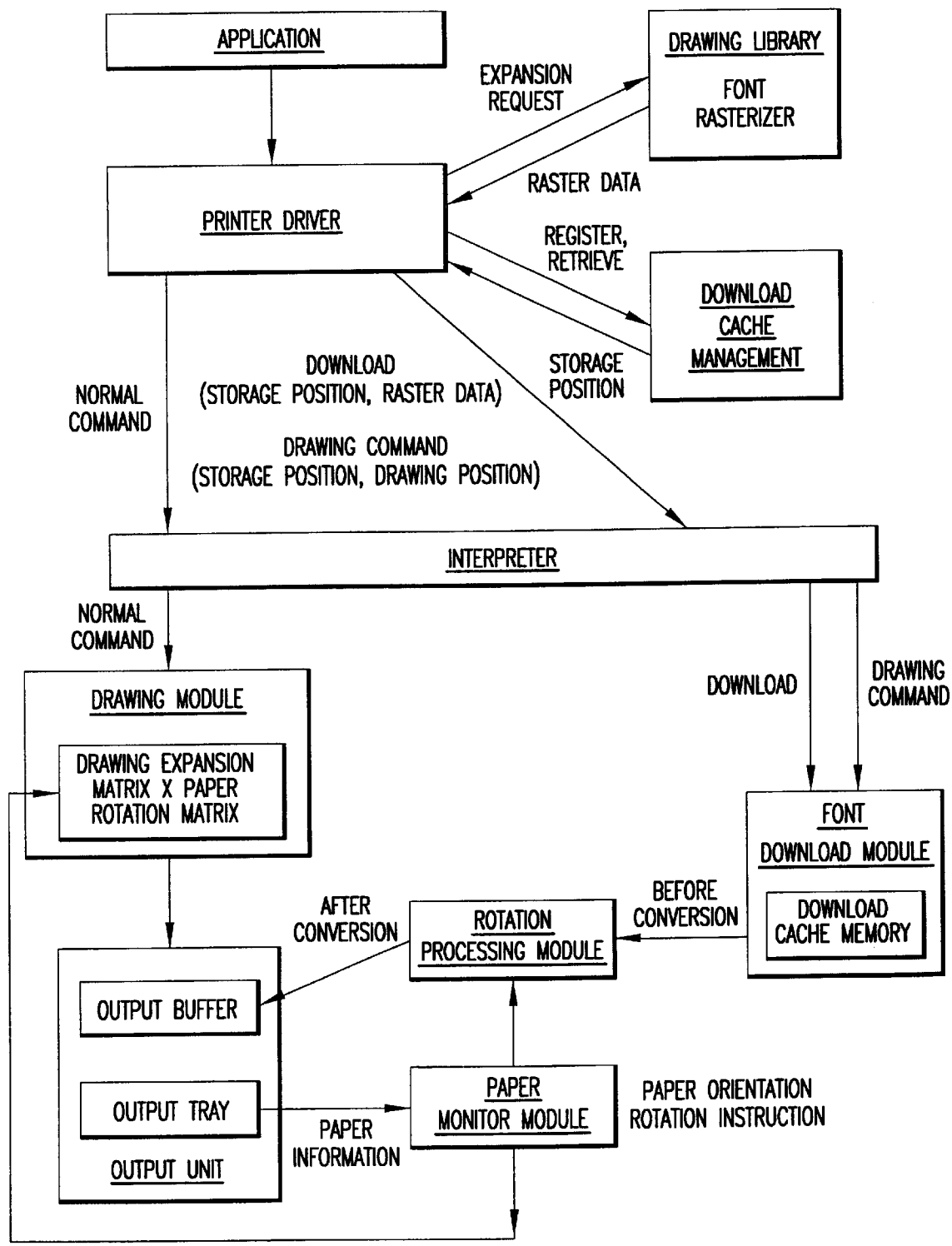
FIG. 6 is a functional block diagram of a first embodiment of the invention.

Next, a computer system of a first embodiment of the invention will be discussed. In the embodiment, as shown in FIG. 6, a host computer is provided with a download cache management module for managing a download cache memory in a printer. That is, the download cache management module always manages the correspondence between font data and storage addresses of the font data in download cache memory and to download font data, the host computer specifies the download address for the printer.

1.2 Hardware Configuration of First Embodiment

Figure 11:
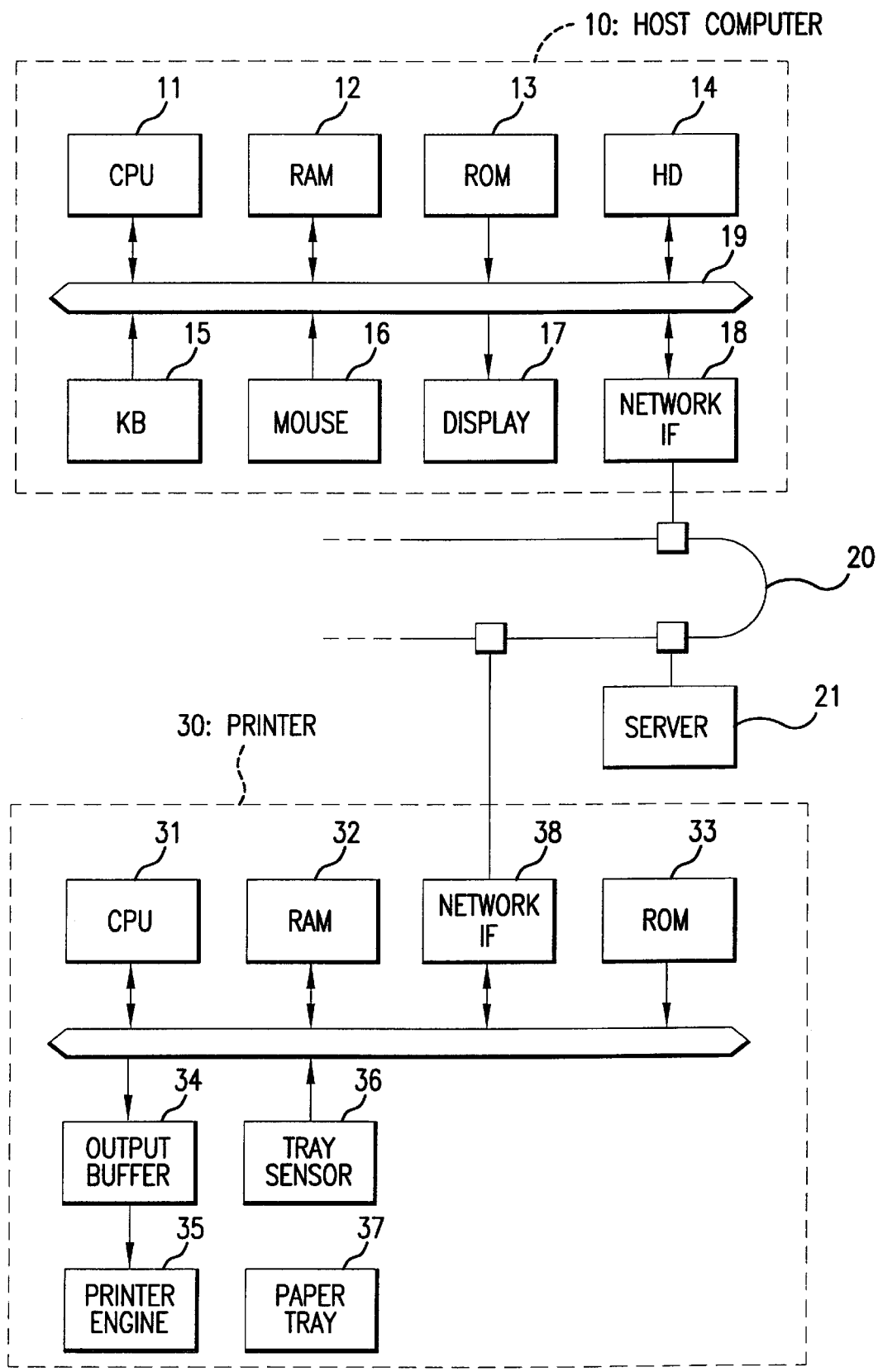
FIG. 11 is a block diagram to show the hardware configuration of the first embodiment of the invention.

Next, the hardware configuration of the first embodiment will be discussed with reference to FIG. 11.

In the figure, numeral 10 is a host computer, which comprises ROM (read-only memory) 13 storing an initial program loader, a hard disk 14 storing an operating system, an application program, font data, a printer driver, etc., RAM (random access memory) 12 into which the programs are loaded, and a CPU (central processing unit) 11 operating based on the programs loaded into the RAM 12. The above-mentioned download cache management module forms a part of the printer driver.

Numeral 15 is a keyboard and numeral 16 is a mouse. The user uses the keyboard 15 and the mouse 16 to enter various pieces of information. Numeral 17 is a display for displaying various pieces of information under the control of the CPU 11. Numeral 18 is a network interface for transferring various pieces of information to and from a network 20. Numeral 21 is a server for managing the network 20. The server 21 has a configuration similar to that of the CPU 10.

Next, numeral 30 is a printer. A CPU 31 installed in the printer 30 controls sections of the printer 30 based on a control program stored in ROM 33. Numeral 32 is RAM used as work memory or cache memory of the CPU 31. Numeral 38 is a network interface for transferring-various pieces of data through the network 20 under the control of the CPU 31. Numeral 37 is a paper tray for storing paper of different sizes and in orientations. Numeral 36 is a tray sensor for monitoring a paper-out condition of the paper tray 37 and informs the CPU 31 of a paper-out condition if occurs. Numeral 34 is an output buffer having a storage capacity of raster data corresponding to a sheet of paper. Numeral 35 is a printer engine for outputting the contents of the output buffer 34 to paper as instructed by the CPU 31.

The control program stored in the ROM 33 contains the following:

(1) An interpreter for interpreting PDL commands generated by the printer driver;

(2) a drawing module for drawing normal graphics data, raster image data, and font data among the commands interpreted by the interpreter;

(3) an output driver for scanning the output buffer 34 and feeding the data in the output buffer 34 to the printer engine 35;

(4) a paper monitor module for giving an instruction of rotation processing, etc., based on the detection result of the tray sensor 36; and (5) a rotation processing module for performing rotation processing and writing drawing data into the output buffer 34 to draw in a paper orientation different from that specified by the host computer.

1.3 Operation of First Embodiment 1.3.1 Output of Printer Font

Figure 12:
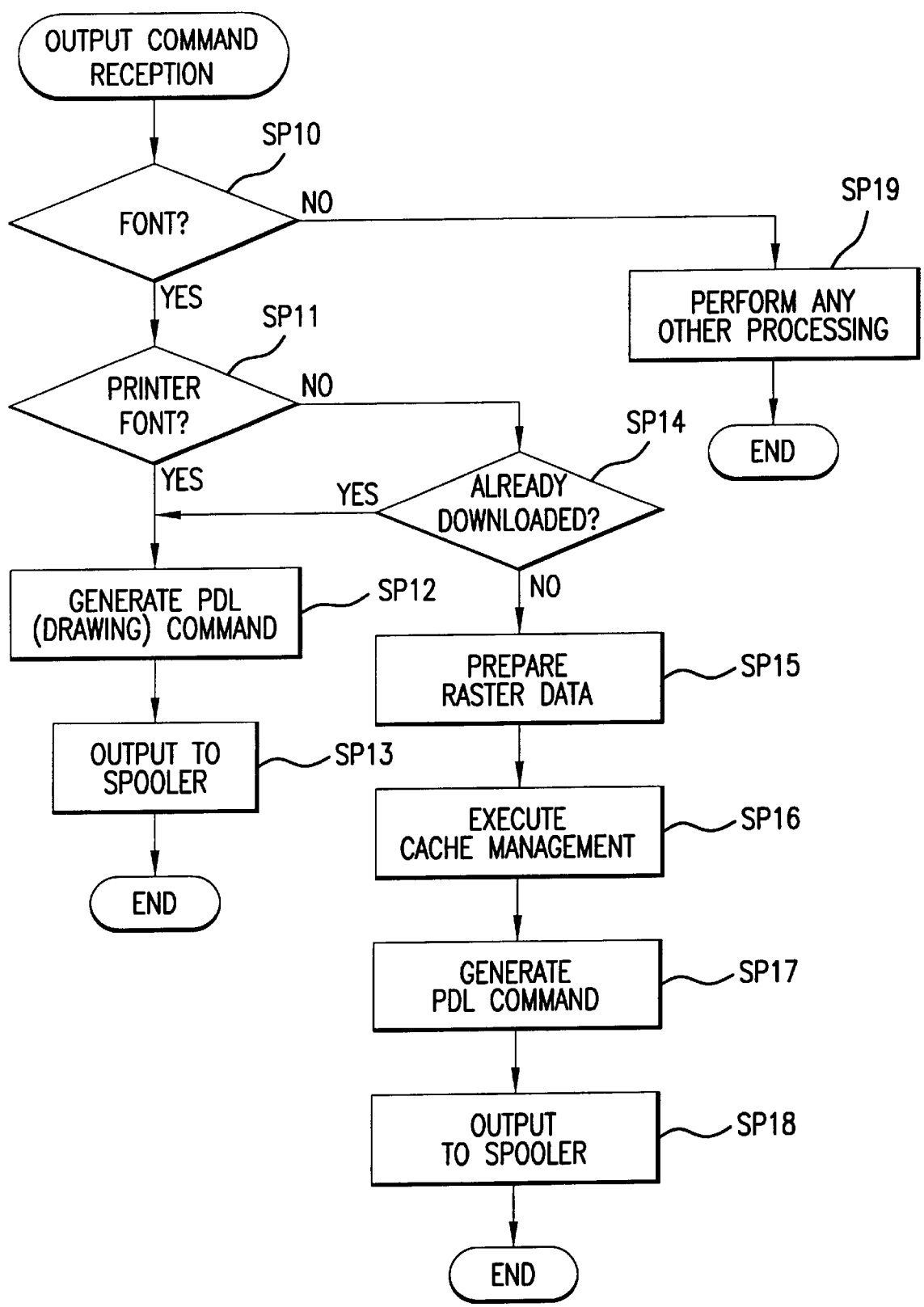
FIG. 12 is a flowchart of a printer driver of the first embodiment of the invention.

The printer driver in the embodiment is called by an output command of an application program, etc., of desktop publishing, etc., for example. When an output command is fed into the printer driver, a routine shown in FIG. 12 is called. In the figure, when control goes to step SP10, whether or not a font is instructed to be output by the output command is determined. If graphics or an image is instructed to be output, control goes to step SP19 and processing responsive to the output object is performed.

If the output object is a font, YES is returned from step SP10 and control goes to step SP11 at which whether or not the font is a printer font is determined. That is, the printer driver is provided with a list of printer fonts stored in the ROM 33 and the table is referenced to determine whether or not the font is a printer font. If YES is returned, control goes to step SP12 and a PDL command, namely, a drawing command is generated.

PDL command parameters include a drawing start position, a font ID, a matrix indicating the character size, and character code. Next, when control goes to step SP13, the generated PDL command is fed into a print spooler. One-character output processing of the printer drive is now complete.

Figures 13A, 13B:
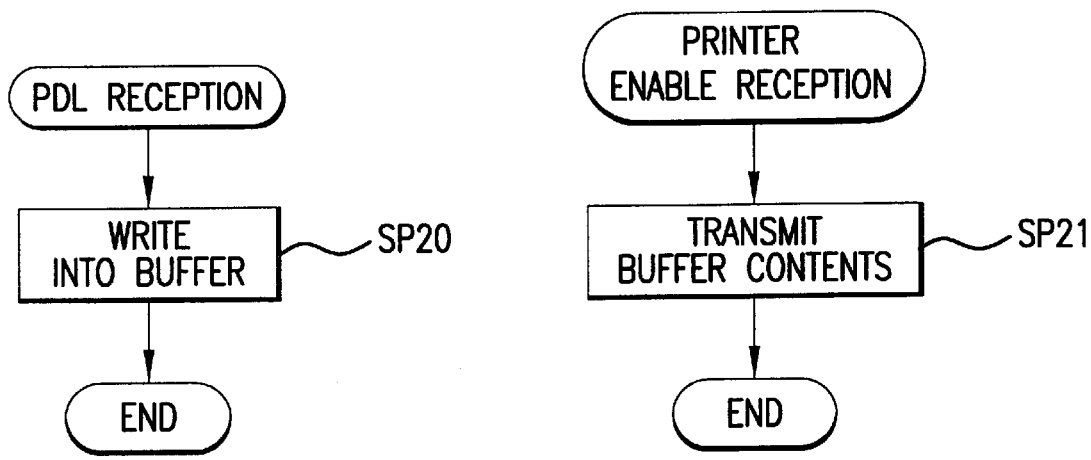
FIGS. 13A and 13B are flowcharts of a print spooler of the first embodiment of the invention.

When the PDL command is output to the print spooler at step SP13, a program shown in FIG. 13A is started in the print spooler. In the figure, when control goes to step SP20, the PDL command is stored in a buffer area reserved in the RAM 12. Therefore, as the step SP13 is executed for a plurality of PDL commands, the PDL commands are stored in the buffer area in order.

The print spooler monitors an enable signal indicating whether or not a PDL command can be fed into the printer 30 through the network 20. When an enable signal is detected, a program shown in FIG. 13B is started. In the figure, when control goes to step SP21, a predetermined amount of PDL command is read from the buffer area and is output through the network interface 18 and the network 20. The area related to the output PDL command is released.

Figures 14A, 14B:
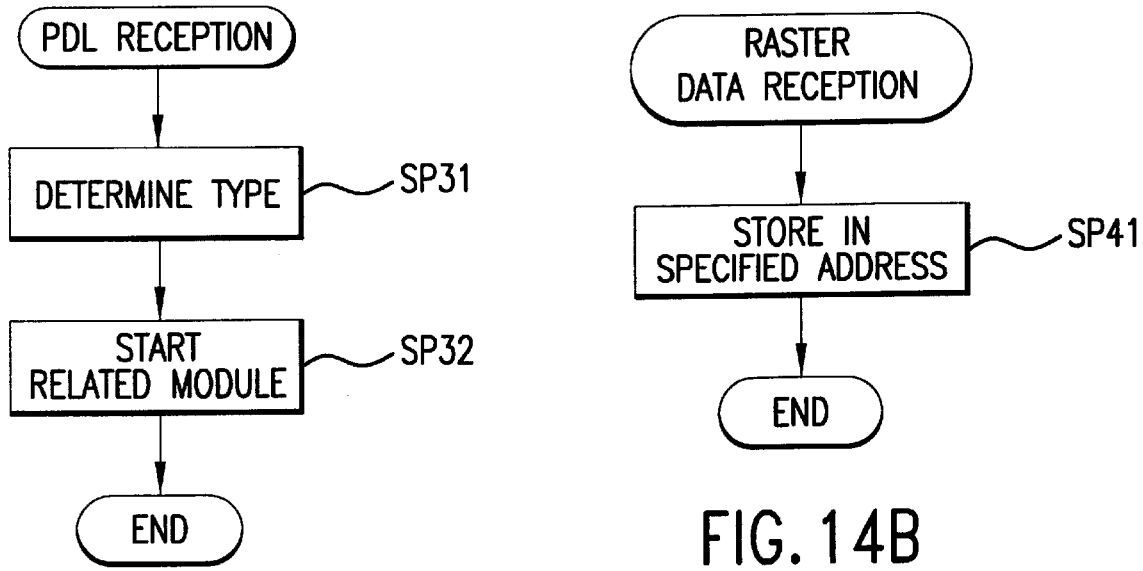
FIGS. 14A and 14B are flowcharts of a printer 30 of the first embodiment of the invention.

When the PDL command is fed into the network interface 38 of the printer 30 from the network 20, a program shown in FIG. 14A is started. In the figure, when control goes to step SP31, what type the PDL command is of (namely, font data, image data, graphics data, etc.,) is determined. Next, when control goes to step SP32, a module responsive to the determined type is started.

For example, if the PDL command is font data, a font module is started. The font module will be discussed in detail with reference to FIG. 15. In the figure, when control goes to step SP51, whether or not the font data is cached is determined. If the font data is not cached, NO is returned. Next, at step SP52, whether or not the font ID related to the PDL command belongs to a printer font is determined.

If the PDL command belongs to a printer font, YES is returned and control goes to step SP53. If NO is returned from step SP52, an operation error of the download cache management module in the printer driver occurs, thus the processing is abnormally terminated. Next, when control goes to step SP53, whether or not a rotation processing instruction is given by the paper monitor module is determined.

If YES is returned, control goes to step SP54 at which a normal expansion matrix of raster data is multiplied by a paper rotation matrix to prepare a new expansion matrix. When control goes to step SP55, font definition data stored in the ROM 33 is read based on the font ID and the character code. The font definition data is multiplied by the previously prepared expansion matrix, thereby preparing raster data.

If a rotation processing instruction is not given by the paper monitor module, the step SP54 is skipped. Therefore, the expansion processing at step SP55 uses the normal expansion matrix not involving rotation. In any case, when control goes to step SP56, the prepared raster data is written into a cache memory area in the RAM 32.

Next, when control goes to step SP57, the raster data is written into the output buffer 34. Processing of the font data is now complete. Next, when the host computer 10 feeds a predetermined print start command into the printer 30, the CPU 31 calls the output driver and the contents of the output buffer 34 are output to paper through the printer engine 35.

Here, assume that an output command for the same font again occurs in an application program in the host computer 10. In this case, similar processing to the previous processing is performed in the printer driver and the print spooler and a PDL command similar to the previous PDL command is fed into the network interface 38 of the printer 30 from the network 20.

Figure 15:
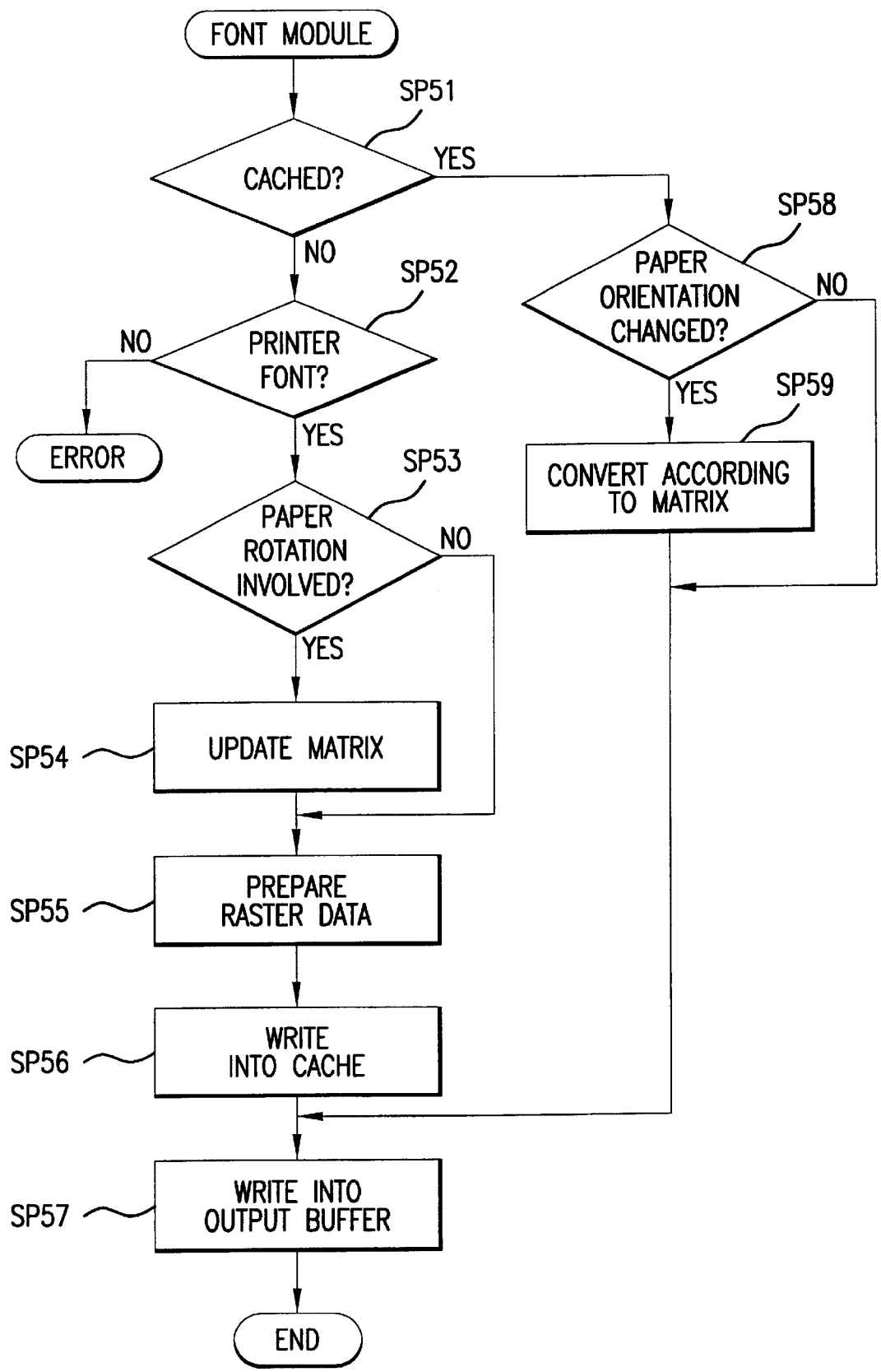
FIG. 15 is a flowchart of a font module of the printer of the first embodiment of the invention.

Therefore, in the printer 30, the programs shown in FIG. 14A and FIG. 15 are again started. In FIG. 15, control goes to step SP51 at which YES is returned because the font data was cached when the step SP56 was previously executed. Then, control goes to step SP58.

At step SP58, whether or not the paper orientation applied when the step SP56 was previously executed differs from the current paper orientation. If the orientations differ, YES is returned and control goes to step SPS9 at which the raster data of the font cached is read and is rotated according to the paper rotation matrix.

Next, when control goes to step SP57, the rotated raster data is written into the output buffer 34. If the current paper orientation is the same as the previous paper orientation, step SP59 is skipped, thus the cached raster data is written into the output buffer 34 as it is.

1.3.2 Output of Non-printer Font

Fonts other than printer fonts are called non-printer fonts. When an application program feeds an output command of a non-printer font to the printer driver, the program in FIG. 12 is again started.

In this case, in the figure, control goes via step SP10 to step SP11 at which NO is returned. Then, control goes to step SP14 at which a management table in the download cache management module is referenced for determining whether or not the non-printer font is downloaded.

If the non-printer font is not downloaded, NO is returned and control goes to step SP15 at which drawing raster data of the non-printer font is prepared using a drawing function in the host computer based on the font ID, the matrix indicating the character size, the character code, the paper orientation set in the host computer, and the output resolution of the printer 30.

Next, when control goes to step SP16, the raster data is registered in the download cache management module. At the time, in the download cache management module, the cache memory top address of the RAM 32 is determined based on the size of the raster data so as to prevent memory fragmentation as much as possible.

Next, when control goes to step SP18, a first PDL command for downloading the raster data and a second PDL command for outputting the font are generated. The first PDL command contains the raster data and the download cache memory address into which the raster data is to be downloaded.

The second PDL command is a dedicated command for specifying the non-print font by specifying download cache memory address. Next, when control goes to step SP18, the PDL commands are fed into the print spooler in order as at step SP13.

When the first PDL command is fed into the printer 30 through the print spooler, the program in FIG. 14A is again started. At step SP31, it is determined that the first PDL command is a command for downloading raster data. Then, when control goes to step SP32, the program in FIG. 14B is called.

In the figure, when control goes to step SP41, raster data is stored in the download address specified in the first PDL command.

Next, when the second PDL command is fed into the printer 30, the program in FIG. 15 is started as with the print font described above. Since non-printer fonts are managed by the download cache management module of the host computer 10, the printer 30 assumes that the corresponding raster data is undoubtedly downloaded based on the fact that "the second PDL command is fed."

That is, YES is always returned from step SP51 and control goes to step SP58. Therefore, the subsequent processing is similar to processing of the cached printer font described above. That is, as required, at step SP59, the raster data is rotated and is written into the output buffer 34. Next, when application program feeds an output command for the same non-printer font to the printer driver, the program in FIG. 12 is again started. In this case, control goes via step SP11 to step SP14 at which YES is returned because the raster data is downloaded. Then, control goes to step SP12.

Therefore, a PDL command similar to the second PDL command previously issued is again generated and is fed into the printer 30. Thus, the raster data is read from the cache memory based on the new PDL command and is rotated as required, then is written into the output buffer 34.

1.3.3 Purge Processing

If the download cache management module of the printer driver is requested to register a font exceeding the cache memory capacity of the RAM 32, the area related to the font used with the statistically lowest frequency is released and an area for the new font is allocated to the released area.

Such a purge processing algorithm is similar to the conventional algorithm adopted for printers. In the embodiment, however, it is not necessary to operate the same algorithm in the printer 30. That is, since the cache memory is managed by the download cache management module, the printer 30 simply performs processing such as storing of fed raster data in the specified address.

1.4 Advantages of First Embodiment

As described above, according to the embodiment, management of the cache memory can be entrusted to the host computer 10, thus a load is taken off the printer 30 and the operation of the printer 30 can be speeded up. Further, trouble such that a purge processing error occurs between the host computer and the printer can be prevented from taking place, and extremely high reliability can be provided.

(Second Embodiment)

2.1 Outline of Second Embodiment

In the first embodiment, if the paper orientation is changed after raster data is once cached, rotation processing is performed at step SP59. It is executed each time the font module (program in FIG. 15) is started. If the rotation processing result is also cached, it is considered that the printer 30 can operate at higher speed.

Figure 7:
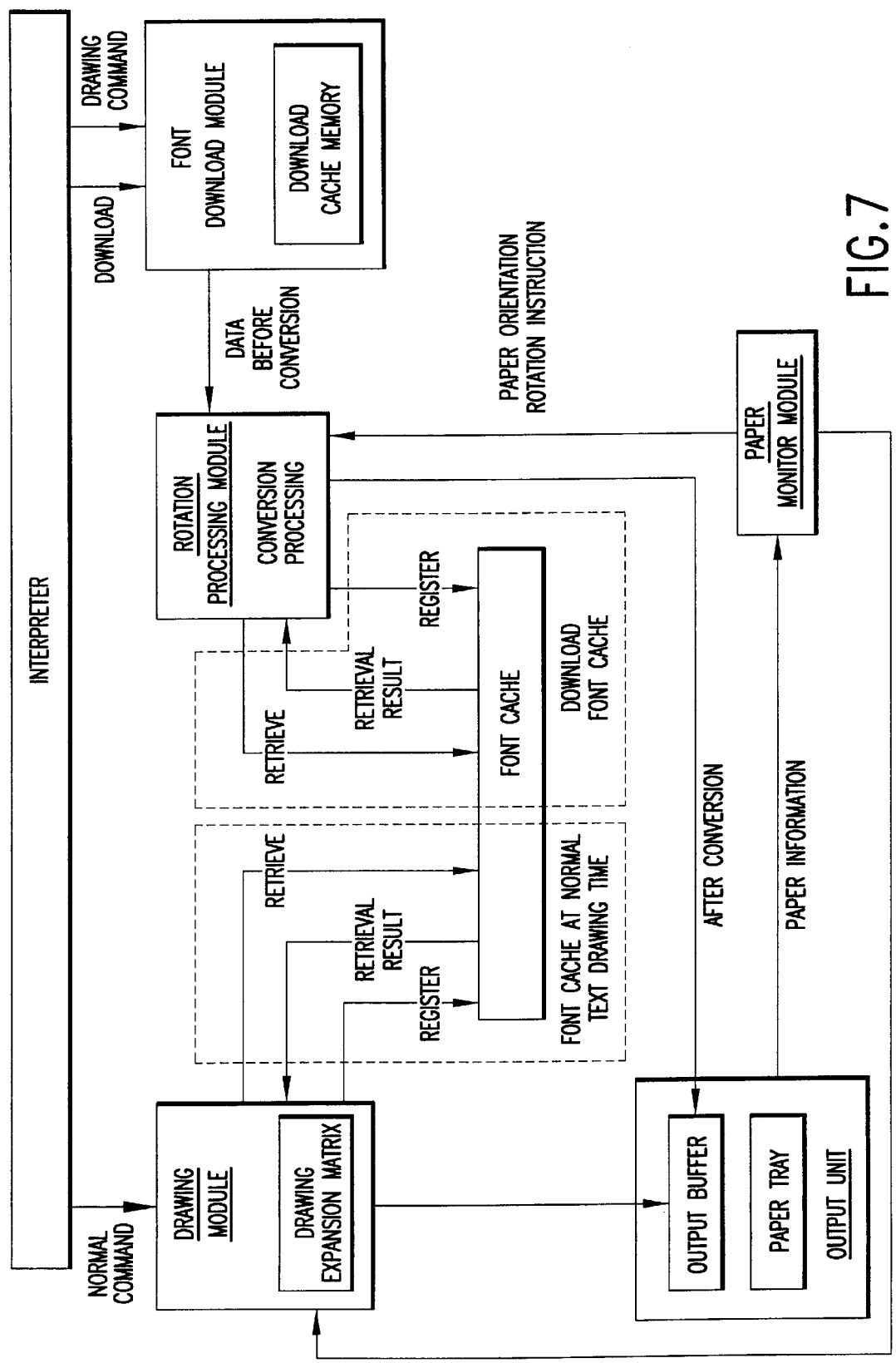
FIG. 7 is a functional block diagram of a second embodiment of the invention.
Figure 8:
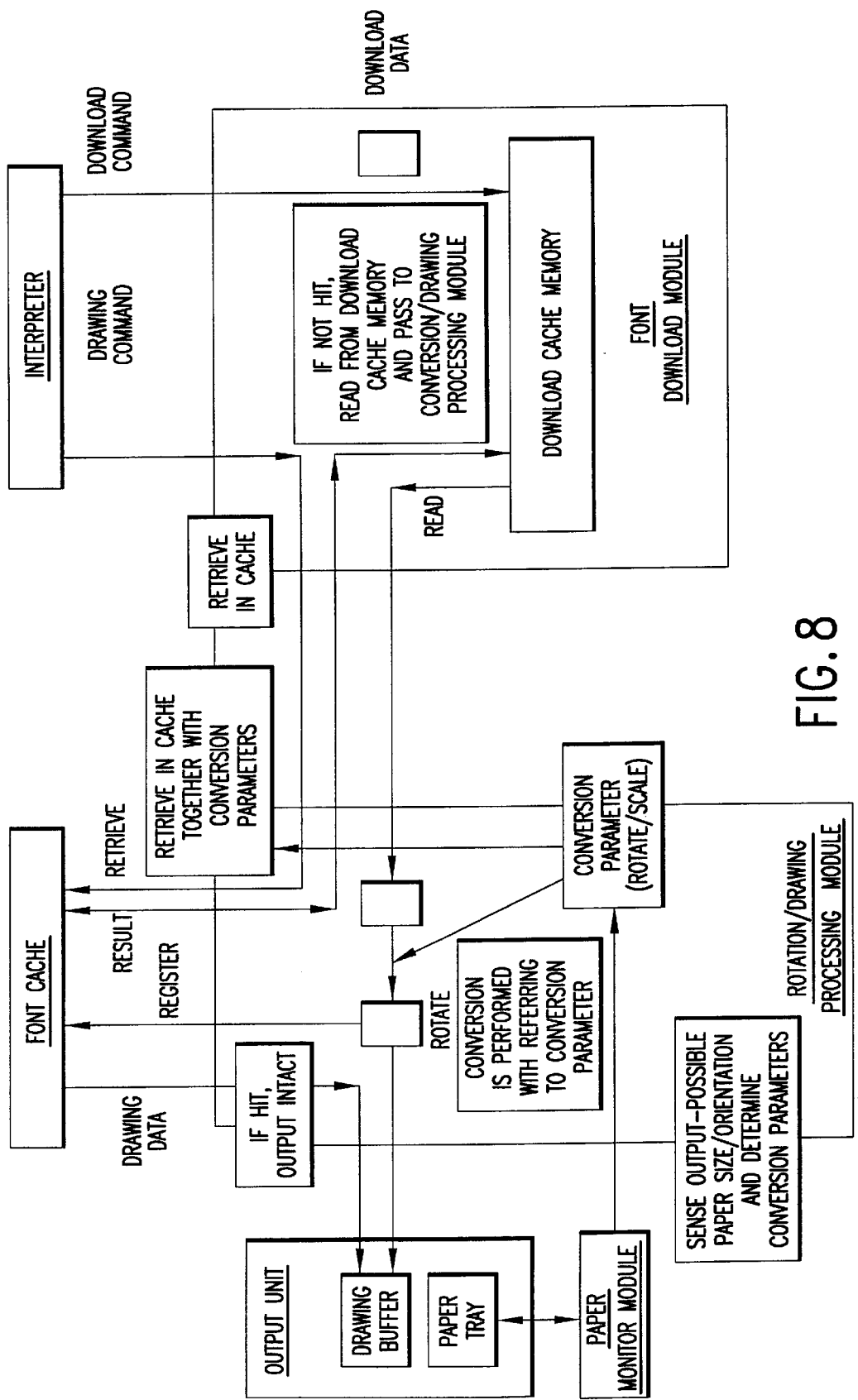
FIG. 8 is a functional block diagram of a main part of the second embodiment of the invention.

A second embodiment of the invention is proposed based on such a viewpoint. First, as shown in FIG. 7 and FIG. 8, cache memory of RAM 32 is roughly divided into download cache memory managed by a download cache management module of a host computer 10 and font cache memory which is managed by a printer 30 in its own right (that cannot be addressed by the download cache management module. That is, the host computer 10 is forbidden to access the font cache memory which managed by the printer 30 in its own right.

Raster data in the paper orientation assumed by the host computer 10 is stored in the download cache memory as in the first embodiment. A rotation processing module determines whether or not rotation processing is required based on the monitor result of a paper monitor module.

If it is determined that rotation processing is required, whether or not the already rotated data is entered in the font cache memory is determined.

If the already rotated data is entered, the contents are written into an output buffer 34. If the already rotated data is not yet entered, the rotation processing module performs rotation processing for the raster data and transfers the result to the font cache memory and the output buffer 34, whereby the cache hit rate can be improved.

2.2 Data Format of Second Embodiment

Cache parameters used with the first embodiment will be discussed with reference to FIG. 9. First, in the figure, (1) Normal font cache refers to a format used to cache a print font; its keys are a font ID, character code, and a scale of a matrix, etc., and the stored data contains the raster data.

Next, (2) Download font cache is a format of non-printer font data in the download cache memory and its key is storage address only. Next, (3) in the figure indicates a data format applied when a non-printer font is converted accompanying rotation or scaling processing. Assuming that the font data in the format is stored in the font cache memory, the data format is similar to that in (1) in the figure. However, since storage address and scale are enough as keys, a key is unused.

The example assumes a cache mechanism having the same number of retrieval keys as the normal font cache to make the cache mechanism common, but a cache mechanism dedicated to the download cache memory may be used considering efficiency of a retrieval mechanism.

2.3 Configuration and Operation of Second Embodiment

Next, the configuration and operation of the second embodiment will be discussed. The hardware and software configurations of the embodiment are similar to those of the first embodiment (FIG. 11–FIG. 14), but a program in FIG. 16 in place of the program in FIG. 15 is used for font module processing.

Figure 16:
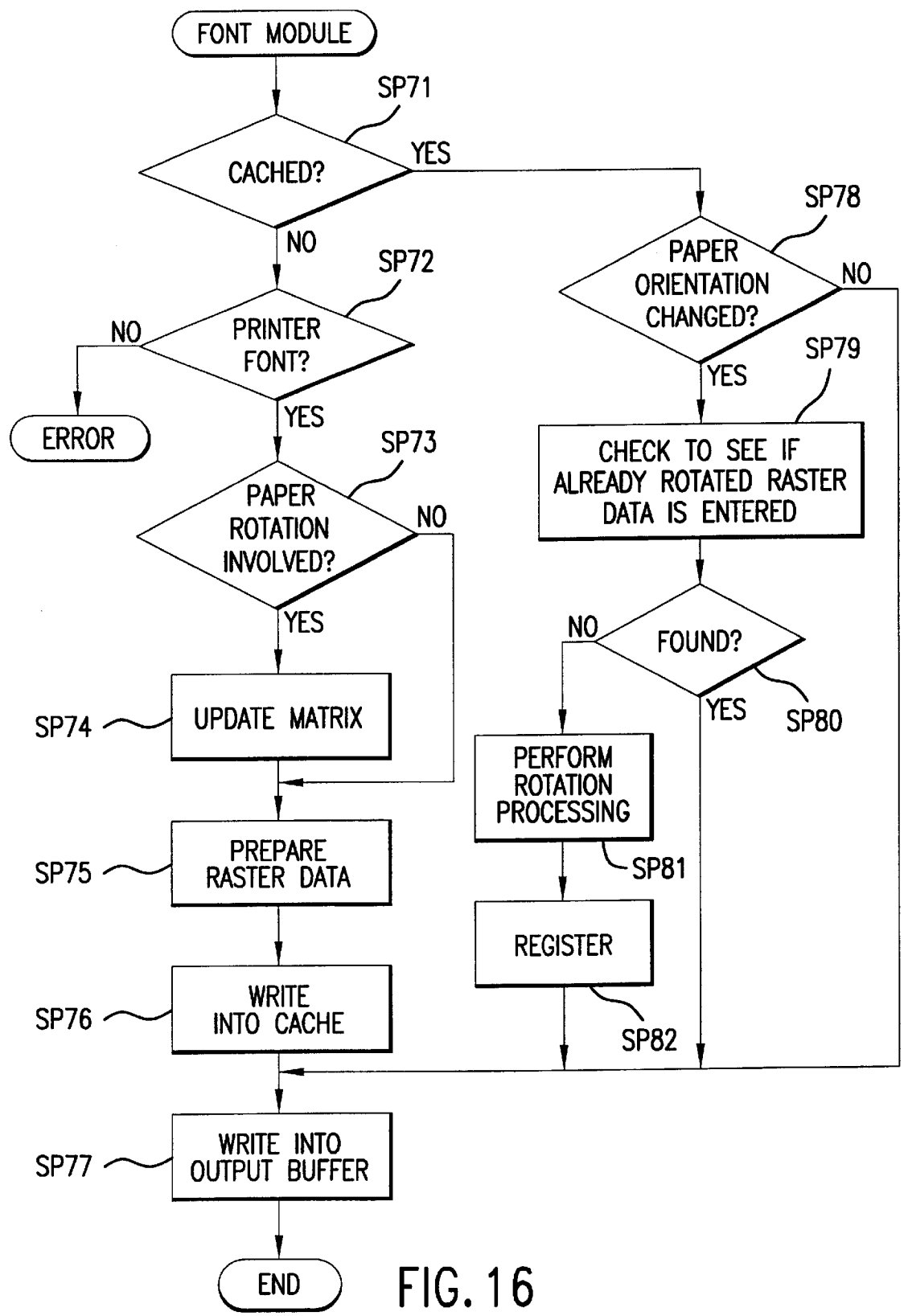
FIG. 16 is a flowchart of a printer driver of the second embodiment of the invention.

In FIG. 16, steps SP71–SP77 are the same as steps SP51–SP57 in FIG. 15. The process sequence executed if YES is returned from step SP71 will be discussed. In FIG. 16, when control goes to step SP78, whether or not the paper orientation is changed is determined as at step SP58 in the first embodiment.

If YES is returned from step SP78, control goes to step SP79 and a check is made to see if already rotated raster data is entered in the normal font cache. Next, when control goes to step SP80, the process branches according to the check result. That is, if already rotated raster data is not entered, control goes to step SP81 and rotation processing is performed for already existing raster data.

Both a printer font and a non-printer font are possible as the "already existing raster data." If the already existing raster data is a printer font, it should exist in the font cache memory; if the already existing raster data is a non-printer font, it should exist in the download cache memory. In any case, the rotated raster data is stored in the font cache memory.

Next, when control goes to step SP82, the rotated raster data is entered in the normal font cache in the data format shown in FIG. 9 (3). Next, when control goes to step SP77, the entered raster data is written into the output buffer 34.

Next, processing executed when a command for outputting with the same font in the same paper orientation is again given will be discussed. In such a case, when a check is made to see if already rotated raster data is entered at step SP79, it is found that the raster data undergoing the rotation processing is found. Therefore, YES is returned from step SP80. Next, at step SP77, the found raster data is written into the output buffer 34 as it is.

2.4 Advantages of Second Embodiment

As described above, according to the embodiment, rotated raster data is also cached. Thus, if the paper orientation is changed in the printer 30, extremely fast output processing is enabled.

(Third Embodiment)

Next, a third embodiment of the invention will be discussed. The first and second embodiments assume that the host computer 10 and the printer 30 communicate with each other in a one-to-one correspondence. However, if data is downloaded from a plurality of host computers to the printer 30, there is a possibility that the cache memory contents may be destroyed.

Figure 17:
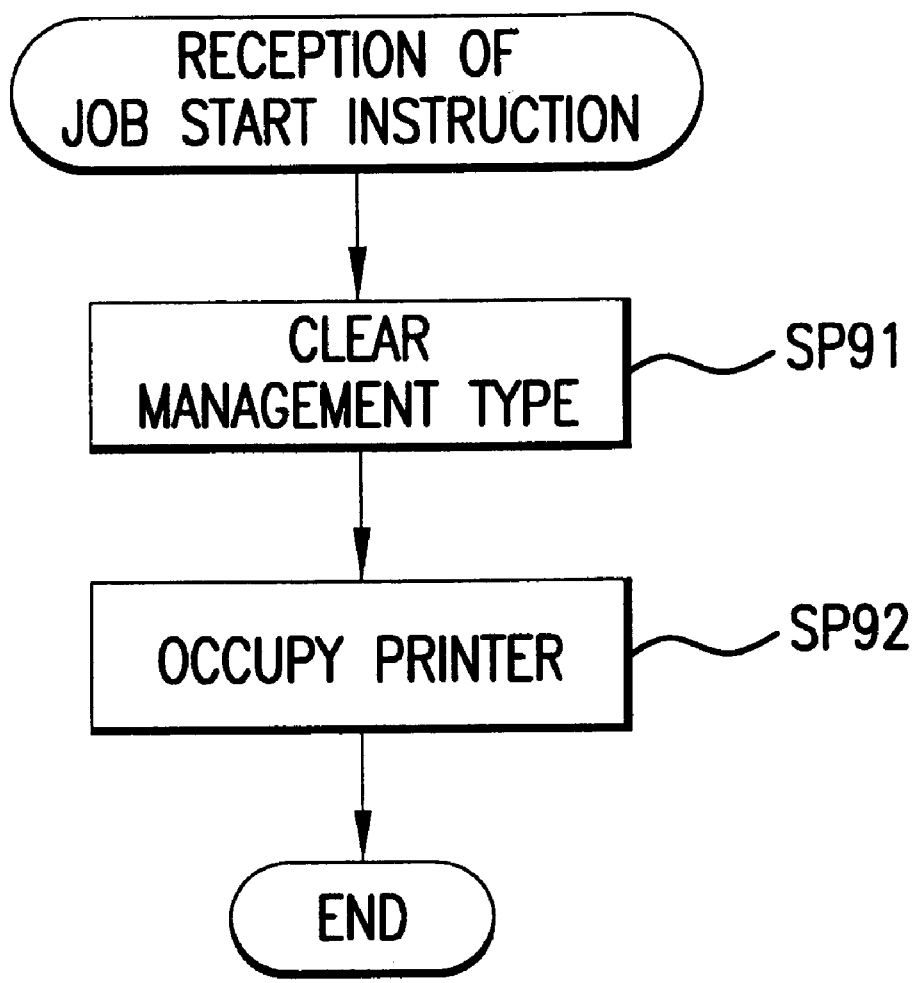
FIG. 17 is a flowchart of a printer driver of a third embodiment of the invention.

Then, in a third embodiment of the invention, when a job start instruction is fed into a printer driver from an application program of a host computer 10, a program shown in FIG. 17 is started. In the figure, when control goes to step SP91, the contents of a download cache management table in the printer driver are cleared.

Next, when control goes to step SP92, a request command for occupying a printer 30 is output through a print spooler. The components and operation of the embodiment other than described above are similar to those of the second embodiment.

Thus, to start a job, the contents of the download cache management table are cleared, the printer 30 is occupied, and other computers are forbidden to access the printer, whereby the cache memory contents can be prevented from being destroyed.

(Fourth Embodiment)

In the third embodiment, the download cache management table is cleared when a new job is started. However, since the cache is cleared when connection is started, the cache hit rate cannot be made very high. Then, a fourth embodiment of the invention enables a download cache management table to be passed to another host computer for using the already prepared table efficiently, as shown in FIG. 10.

To pass the management table, the following two methods are possible: First, a printer 30 is provided with a function of downloading the download cache management table, whereby the table is downloaded at the connection end time and the next host computer connected to the printer 30 uploads the table, whereby continuous use of the management table is enabled.

However, since downloading or uploading requires traffic, preferably such processing can be canceled whenever necessary. That is, in the printer 30, it is advisable to check whether or not the management table is downloaded at the disconnection time and send data only when the management table is downloaded and an upload instruction is given next time.

If an upload instruction is input from the next host computer although the management table is not downloaded, an error message may be returned to the host computer. In the host computer receiving the error message, a job is started from a state in which the management table is cleared.

Figure 18:
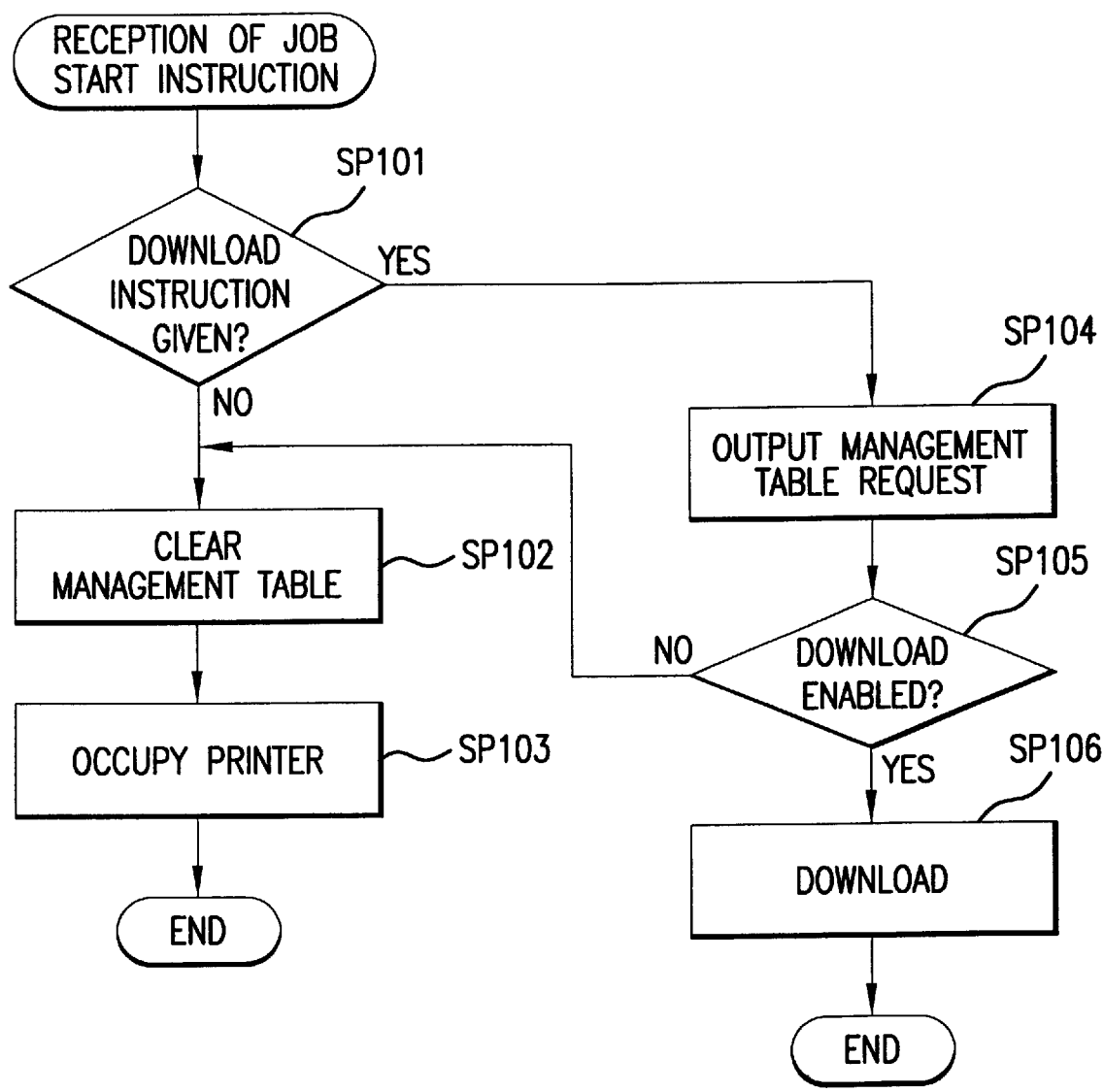
FIG. 18 is a flowchart of a printer driver of the fourth embodiment of the invention.

FIG. 18 shows a processing routine of a printer driver at the job start time for realizing such processing. In the figure, when control goes to step SP101, whether or not an instruction for downloading the management table is given from an application program is determined. That is, whether or not the management table needs to be downloaded is specified from the application program based on whether or not the application program user requires high-quality output.

If necessity for downloading the table is not specified, NO is returned from step SP101, then steps SP102 and SP103 are executed and processing similar to that of the third embodiment is performed. On the other hand, if necessity for downloading the table is specified, YES is returned from step SP101 and control goes to step SP104 at which a management table request is output and control waits until a response to the request is made.

When a response is made, control goes to step SP105 and whether or not the management table can be downloaded is determined. If the management table cannot be downloaded, steps SP102 and SP103 are executed and processing similar to that of the third embodiment is performed. On the other hand, if the management table can be downloaded, control goes to step SP106 and the management table is downloaded.

As described above, in the embodiment, the previously prepared download cache management table can be passed for performing output processing, so that the cache hit rate can be improved and faster image output is enabled.

(Modified Embodiments)

As this invention may be embodied in various forms without departing from the spirit of essential characteristics thereof, the present embodiments are therefore illustrative and not restrictive, since the scope of the invention is defined by the appended claims rather than by the description of the specification, and all changes that fall within meets and bounds of the claims, or equivalence of such meets and bounds are therefore intended to embraced by the claims.

For example, the following modified forms of the embodiments are possible:

5.1 In the embodiments, the RAM 12, the ROM 13, the hard disk 14, the RAM 32, and the ROM 33 are named as examples of recording media. However, media capable of storing information, such as floppy disk, CD-ROM, magnetic tape, and magneto-optic disk, all fall under the category of recording media mentioned in the invention.

5.2 In the fourth embodiment, the download cache management table is downloaded into the printer 30, but is not necessarily downloaded into the printer 30 and may be downloaded into the facilities connected to the network 20, such as the server 21.

As described above, according to the invention, the image output system is controlled based on the cache management table of the image processing system, so that the resources can be used effectively and precise processing is enabled.

What is claimed is:

1. An image output system comprising:

memory for storing drawing data;

reception means for receiving a drawing command or a write command including drawing data and address information indicating a location where the drawing data is stored from an external system;

determination means for determining whether a command is the drawing command or the write command;

write means for writing the drawing data received by said reception means into a first cache area of said memory based on the address information received by said reception means if the determination means determines that the command is the write command; and drawing means for drawing by using the drawing data written by said write means if the determination means determine that the command is the drawing command.

2. An image output system comprising:

memory for storing drawing data;

reception means for receiving drawing data and address information indicating a location where the drawing data is stored from an external system;

write means for writing the drawing data received by said reception means into a first cache area of said memory based on the address information received by said reception means;

drawing means for drawing by using the drawing data written by said write means;

determination means for determining whether or not the drawing data written into said memory by said write means meets a drawing condition under which said drawing means should draw; and conversion means for converting the drawing data written into said memory into drawing data meeting the drawing condition if said determination means determines that the drawing data does not meet the drawing condition, wherein said drawing means draws by using the drawing data provided by said conversion means.

3. The image output system of claim 2, wherein the drawing condition determined by said determination means as to whether or not the drawing data meets the drawing condition contains an image scaling factor.

4. The image output system of claim 2, wherein the drawing condition determined by said determination means as to whether or not the drawing data meets the drawing condition contains an image drawing direction.

5. The image output system of claim 2, further comprising:

conversion data write means for writing the drawing data provided by said conversion means into a second cache area of said memory.

6. The image output system of claim 5, further comprising:

area management means for managing the first cache area and the second cache area, wherein said area management means allocates the first cache area and the second cache area to different address spaces.

7. The image output system of claim 6, wherein said area management means can change sizes of the first cache area and the second cache area.

8. An image processor for supplying drawing data to an image output system having cache memory for storing drawing data, said image processor comprising:

drawing data output means for outputting drawing data to said image output system;

a cache management table for managing contents of said cache memory;

cache determination means for determining whether or not the drawing data is stored in said cache memory based on contents of said cache management table; and data output means for outputting the drawing data, address information for writing the drawing data into said cache memory, and a write command for writing the drawing data into said cache memory to said image output system if said cache determination means determines that the drawing data is not stored.

9. The image processor of claim 8, further comprising:

initialization means for initializing said cache management table each time a new job occurs.

10. The image processor of claim 8, further comprising:

transmission means for transmitting the contents of said cache management table to said image output system or another image processor.

11. The image processor of claim 8, further comprising:

reception means for receiving the contents of said cache management table from said image output system or another image processor.

12. An image processing system comprising an image processor for preparing image data and an image output system for printing based on the image data sent from said image processor, wherein said image processor comprises:

transmission means for transmitting font data corresponding to a font not contained in said image output system thereto; and first storage means for storing contents of the font data transmitted by said transmission means and stored in said image output system, and wherein said image output system comprises:

memory for storing drawing data;

write means for writing the font data transmitted by said transmission means into a first cache area of said memory;

matrix conversion means for applying matrix conversion to the font data stored in the first cache area; and conversion data write means for writing the font data to which the matrix conversion has been applied by said matrix conversion means into a second cache area of said memory.

13. The image processing system of claim 12, wherein said image output system further comprises:

second storage means for storing contents stored in the second cache area of said memory;

retrieval means for retrieving font data required for printing in the second cache area of said memory based on the contents stored in said second storage means; and control means for instructing said matrix conversion means to apply matrix conversion to the font data stored in the first cache area of said memory if the required font data is not found in the second cache area of said memory as a result of the retrieval of said retrieval means.

14. An image output system for outputting image data transmitted from an image processor, comprising:

memory for storing drawing data sent from said image processor;

write means for writing font data transmitted from said image processor into a first cache area of said memory;

matrix conversion means for applying matrix conversion to the font data stored in the first cache area; and conversion data write means for writing the font data to which the matrix conversion has been applied by said matrix conversion means into a second cache area of said memory.

15. An image output method in an image output system having memory for caching drawing data, said image output method comprising:

- a first reception step of receiving drawing data from an external system;
- a second reception step of receiving address information indicating a location where the drawing data is stored from the external system;
- a storage step of storing the drawing data received by the first reception step in a first cache area of said memory based on the address information received by the second reception step;
- a third reception step of receiving a drawing command containing information indicating an address where the drawing data is stored by the storage step;
- a drawing step o f drawing by using the drawing data stored in the cache area of said memory based on the drawing command received by the third reception step;
- a determination step of determining whether or not the drawing data stored by the storage step meets a drawing condition;
- a conversion step of converting the drawing data stored by the storage step if the determination step determines that the drawing data does not meet the drawing condition, and
- a conversion data storage step of storing the drawing data resulting from the conversion executed by the conversion step in a second cache area of said memory.

* * * * *